United States Patent
Donaldson et al.

(10) Patent No.: US 9,005,557 B2
(45) Date of Patent: Apr. 14, 2015

(54) PRODUCTION OF HIGH PURITY LITHIUM COMPOUNDS DIRECTLY FROM LITHIUM CONTAINING BRINES

(75) Inventors: Andrew John Donaldson, Gastonia, NC (US); Daniel Alfred Boryta, Mooresboro, NC (US)

(73) Assignee: Rockwood Lithium Inc., Kings Mountain, NC (US)

(*) Notice: Subject to any disclaimer, the term of this patent is extended or adjusted under 35 U.S.C. 154(b) by 366 days.

(21) Appl. No.: 13/284,445

(22) Filed: Oct. 28, 2011

(65) Prior Publication Data

US 2012/0189516 A1   Jul. 26, 2012

Related U.S. Application Data

(60) Provisional application No. 61/434,571, filed on Jan. 20, 2011.

(51) Int. Cl.
| | | |
|---|---|---|
| C01D 15/08 | (2006.01) | |
| C01D 3/08 | (2006.01) | |
| C01D 15/04 | (2006.01) | |
| C02F 1/58 | (2006.01) | |

(52) U.S. Cl.
CPC *C01D 15/08* (2013.01); *C01D 3/08* (2013.01); *C01D 15/04* (2013.01); *C01P 2006/80* (2013.01); *C02F 1/58* (2013.01)

(58) Field of Classification Search
None
See application file for complete search history.

(56) References Cited

U.S. PATENT DOCUMENTS

| | | |
|---|---|---|
| 2,516,109 A | 7/1950 | Ellestad et al. |
| 4,274,834 A | 6/1981 | Brown et al. |
| 4,723,962 A | 2/1988 | Mehta |
| 4,980,136 A | 12/1990 | Brown et al. |
| 5,219,550 A | 6/1993 | Brown et al. |
| 6,207,126 B1 | 3/2001 | Boryta et al. |
| 6,547,836 B1 | 4/2003 | Lukes |
| 8,057,764 B2 | 11/2011 | Boryta |
| 2007/0148077 A1 | 6/2007 | Boryta et al. |
| 2011/0305624 A1 | 12/2011 | Sadan |

FOREIGN PATENT DOCUMENTS

WO   2011/138389 A1   11/2011

OTHER PUBLICATIONS

International Preliminary Report on Patentability issued by the International Bureau of WIPO on Aug. 1, 2013 in a corresponding International patent application PCT/US2011/058350.

*Primary Examiner* — Melissa Swain
(74) *Attorney, Agent, or Firm* — Norton Rose Fulbright US LLP

(57) ABSTRACT

A process for reducing the amount of magnesium in a lithium-containing brine by adding an aqueous solution of KCl to the brine to precipitate at least some of the magnesium as carnallite salt is disclosed. Lithium salts prepared using this magnesium removal process are also disclosed.

7 Claims, 8 Drawing Sheets

PRODUCTION OF HIGH PURITY LITHIUM COMPOUNDS DIRECTLY FROM LITHIUM CONTAINING BRINES

RELATED APPLICATIONS

This application claims the benefit of U.S. Provisional Patent Application No. 61/434,571 filed Jan. 20, 2011, incorporated herein by reference in its entirety for all purposes.

FIELD OF THE INVENTION

The present invention is related to methods of recovering lithium from brines that contain magnesium as an impurity, and production of purified lithium salts from those brines. Much of the magnesium is precipitated from the brine as carnallite by additives of a potassium chloride solution after concentrating the lithium, if necessary, to a concentration of at least 4.5 wt %.

BACKGROUND OF THE INVENTION

Lithium is often present in naturally occurring brines, but is only one of many ions present in the brine. Thus, to recover the lithium, it is often necessary to remove other ions in the brine in order to recover lithium as lithium salts that are sufficiently pure that they can be used in industrial or pharmaceutical applications. For example, cations such as magnesium, sodium, calcium, and potassium may be present with many counteranions such as chloride, bromide, sulfates, nitrates, borates, and the like. Some examples of natural brines that contain lithium are set forth in the following Table:

TABLE 1

| NATURAL BRINE COMPOSITION | | | | | | | | |
|---|---|---|---|---|---|---|---|---|
| | Ocean | Dead Sea Israel | Great Salt Lake Utah | Bonneville Brine Utah | Salton Sea Brine Calif | Silver Peak Brine Nevada | Salar de Atacama Brines Chile | |
| Na | 1.05 | 3.0 | 7.0 | 9.4 | 5.71 | 6.2 | 7.17 | 5.70 |
| K | 0.038 | 0.6 | 0.4 | 0.6 | 1.42 | 0.8 | 1.85 | 1.71 |
| Mg | 0.123 | 4.0 | 0.8 | 0.4 | 0.028 | 0.02 | 0.96 | 1.37 |
| Li | 0.0001 | 0.002 | 0.006 | 0.007 | 0.022 | 0.02 | 0.15 | 0.193 |
| Ca | 0.04 | 0.05 | 1.5 | 0.5 | 0.0 | 0.71 | 1.46 | 0.043 |
| Cl | 1.9 | 16.0 | 14.0 | 16.0 | 15.06 | 10.06 | 16.04 | 17.07 |
| Br | 0.0065 | 0.4 | 0.0 | 0.0 | 0.0 | 0.002 | 0.005 | 0.005 |
| B | 0.0004 | 0.003 | 0.007 | 0.007 | 0.039 | 0.005 | 0.04 | 0.04 |
| Li/Mg | 0.0008 | 0.0005 | 0.0075 | 0.0175 | 0.786 | 1.0 | 0.156 | 0.141 |
| Li/K | 0.0026 | 0.0033 | 0.015 | 0.0049 | 0.0155 | 0.016 | 0.081 | 0.113 |
| Li/Ca | 0.0025 | 0.0064 | 0.2 | 0.0583 | 0.0008 | 1.0 | 4.84 | 0.244 |
| Li/B | 0.25 | 0.6666 | 0.857 | 1.0 | 0.051 | 4.0 | 3.75 | 4.83 |

(All values except ratios in weight percent)

Each ion that is present in addition to the lithium can be considered as an impurity for purposes of lithium extraction, as each presents its own problems when present in the recovered lithium or lithium salts.

For example, sodium shortens the useful life of lithium ion batteries. For pharmaceutical use, lithium carbonate should be of extreme purity and should not contain any other ions to the extent possible.

Magnesium impurity is problematic because it is accepted, although not proven, that lithium chloride crystal containing 0.07 wt % Mg may be too high in magnesium to be used for producing lithium metal and for subsequent use in the production of lithium organometallic compounds. Thus, the industry demands that organolithium catalysts in polymerization reactions be low in magnesium. Additionally, magnesium impurities can adversely effect the operation of a lithium electrolysis cell when producing lithium metal from lithium salts.

Thus, it is desirable to remove magnesium, in particular, and as many other ions as possible while processing the brine prior to recovering the lithium in the form of the desired salt.

For example, in U.S. Pat. No. 5,219,550 Brown and Boryta describe a method for producing chemical grade lithium carbonate from natural lithium containing brine by, inter alia, removing magnesium by solar concentration, wherein any remaining magnesium is removed by adding a base to precipitate magnesium as its carbonate and/or hydroxide salts.

U.S. Pat. No. 4,980,136 discloses a procedure for preparing chemical grade and low sodium lithium chloride that is substantially purified from boron and magnesium (battery grade, less than 20 ppm sodium and less than 5 ppm magnesium) from concentrated natural brine by crystallizing lithium chloride from a magnesium/lithium chloride brine to produce a chemical grade of lithium chloride crystal, followed by alcoholic extraction of the soluble lithium chloride from the crystal leaving sodium chloride as the insoluble phase. The alcohol solution containing the lithium chloride is then filtered and evaporated to form a high purity grade of lithium chloride crystal.

Another process for producing lithium chloride is set forth in Chilean Patent Application No. 550-95, which describes a procedure whereby a purified brine containing essentially lithium chloride is directly produced from natural brines that have been concentrated by solar evaporation and treated by an extraction process to remove boron. However, the sodium, magnesium, calcium, and sulfate levels in the resultant brine are too high to be an acceptable brine source of lithium chloride for producing a technical grade lithium metal, primarily because the two major remaining impurities, sodium and magnesium, have to be further reduced to acceptable levels to produce chemical grade lithium chloride crystal. Specifically, magnesium must be reduced to less than 0.005 wt % Mg, and sodium to less than 0.16 wt % Na in the anhydrous lithium chloride salt. Salting out anhydrous lithium chloride directly from brine above 110° C. in a vacuum crystallizer as described in U.S. Pat. No. 4,980,136 yields a lithium chloride containing at best 0.07 wt % Mg and 0.17 wt % Na.

One such commercial method involves extraction of lithium from a lithium containing ore or brine to make a pure lithium sulfate solution such as described in U.S. Pat. No.

2,516,109, or a lithium chloride solution such as described in U.S. Pat. No. 5,219,550. After purifying the solutions, sodium carbonate is added as either a solid or a solution to precipitate lithium carbonate crystals. The lithium carbonate is subsequently filtered from the spent liquor (mother liquor), and the lithium carbonate is washed, dried, and packaged.

Lithium carbonate is often used as a feed material for producing other lithium compounds such as lithium chloride, lithium hydroxide monohydrate, lithium bromide, lithium nitrate, lithium sulfate, lithium niobate, etc. Lithium carbonate itself is used as an additive in the electrolytic production of aluminum to improve cell efficiency and as a source of lithium oxide in the making of glass, enamels, and ceramics. High purity lithium carbonate is used in medical applications.

For example, a presently used commercial procedure for producing chemical grade lithium chloride is to react a lithium base such as lithium carbonate or lithium hydroxide monohydrate with concentrated hydrochloric acid to produce a pure lithium chloride brine. The resultant lithium chloride brine is evaporated in a vacuum crystallizer at or above 110° C. to produce an anhydrous lithium chloride crystal product. This procedure yields a product that meets most commercial specifications for chemical grade lithium chloride, but not low sodium grades of lithium chloride. Chemical grade lithium chloride is suitable for air drying applications, fluxes, an intermediate in manufacture of mixed ion-exchange zeolites, and as a feed to an electrolysis cell for producing chemical grade lithium metal. Chemical grade lithium metal is used, inter alia, to produce lithium organometallic compounds. These compounds are used as catalysts in the polymerization and pharmaceutical industries.

Chemical grade anhydrous lithium chloride should contain less than 0.16% sodium in order to produce metal containing less than 1% sodium. The importance of minimizing the sodium content in the metal and the costs associated therewith are the principal reasons for using lithium hydroxide monohydrate or lithium carbonate as the raw material for producing lithium chloride and, subsequently, lithium metal. In consideration, low sodium lithium chloride, typically contains less than 0.0008 wt % sodium, and is commercially produced to manufacture low sodium lithium metal suitable for battery applications and for producing alloys.

Commercially, low sodium lithium chloride is produced indirectly from chemical grade lithium carbonate. Chemical grade lithium carbonate is produced from Silver Peak Nevada brine, Salar de Atacama brines in Chile, Hombre Muerto brines in Argentina, and from spodumene ore (mined in North Carolina). The lithium carbonate is converted to lithium hydroxide monohydrate by reaction with slaked lime. The resultant slurry contains precipitated calcium carbonate and a 2-4 wt % lithium hydroxide solution, which are separated by filtration.

The lithium hydroxide solution is concentrated in a vacuum evaporation crystallizer in which the lithium hydroxide monohydrate is crystallized, leaving the soluble sodium in the mother liquor solution. The crystalline lithium hydroxide monohydrate is separated from the mother liquor, washed, and dried. This salt normally contains between 0.02 and 0.04% sodium. To further reduce the sodium levels, the lithium hydroxide monohydrate must be dissolved in pure water and recrystallized, and subsequently reacted with pure hydrochloric acid to form a concentrated lithium chloride brine containing less than 10 ppm sodium. The resultant lithium chloride solution is evaporated to dryness to yield anhydrous lithium chloride suitable for producing battery grade lithium metal containing less than 100 ppm sodium. The above process requires seven major processing steps described as follows:

1) Extraction and purification of a low boron aqueous solution containing 0.66 to 6 wt % Li from lithium containing ore or natural brine;
2) Purification of the brine with respect to magnesium and calcium and filtration;
3) Precipitation of lithium carbonate from the purified brine by addition of $Na_2CO_3$, and filtering and drying the lithium carbonate;
4) Reacting slaked lime and lithium carbonate to produce a LiOH solution and filtering to remove calcium carbonate;
5) Crystallizing $LiOH.H_2O$ in a vacuum crystallizer;
6) Dissolving the $LiOH.H_2O$ crystals and re-crystallizing $LiOH.H_2O$ from solution; and
7) Reacting high purity HCl with re-crystallized $LiOH.H_2O$ to produce a high purity lithium chloride brine from which low sodium lithium chloride is crystallized and drying the lithium chloride.

Low sodium lithium carbonate can be prepared from re-crystallized $LiOH.H_2O$ using the first part of the process described above. The recrystallized $LiOH.H_2O$ is then mixed with water and reacted with $CO_2$ to precipitate the lithium carbonate. The processing steps are set forth below:

1) Extract and purify a low boron aqueous solution containing 0.66 to 6 wt % Li from lithium containing ore or natural brine;
2) Purify the brine with respect to magnesium and calcium and filtration.
3) Precipitate $Li_2CO_3$ from the purified brine with the addition of $Na_2CO_3$, filtration, and drying.
4) React slaked lime and $Li_2CO_3$ to produce a LiOH solution and filter.
5) Crystallize $LiOH.H_2O$ in a vacuum crystallizer.
6) Dissolve again and re-crystallize $LiOH.H_2O$ from solution.
7) React $CO_2$ gas with a slurry containing re-crystallized $LiOH.H_2O$ to crystallize low sodium high purity lithium carbonate crystal, filter, and dry.

Production of lithium chloride directly from concentrated brine has also been described in U.S. Pat. No. 4,274,834.

In prior patents methods of recovering highly purified lithium salts, e.g., lithium carbonate and lithium chloride, from salt brines were described. (See. e.g., U.S. Pat. No. 6,207,126. This and all patents and references cited herein are incorporated herein by reference in their respective entireties for all purposes.) A very basic overview of the processes described therein is that ionic impurities from the brine must be removed in order to recover lithium salts of sufficiently pure levels for use in a given application, e.g., lithium ion batteries, pharmaceutical applications, etc. Purification takes place by removing calcium, boron, magnesium, and other naturally occurring impurities by, e.g., precipitating those impurities as salts which are insoluble under the conditions present in the brine. It is particularly important to remove magnesium from the brine, and presently this is removed by precipitating magnesium as carnallite ($KMgCl_3.6H_2O$) and, once potassium levels are sufficiently reduced, as bischofite ($MgCl_2.6H_2O$). During this process, the lithium concentration in the brine gradually increases to a level such that it begins to precipitate along with the magnesium as lithium carnallite ($LiMgCl_3.7H_2O$). This continues until the brine contains about 6% Li and about 2% Mg. Extremely pure lithium salts are then produced from this brine. A difficulty with this process presents in the loss of lithium during lithium carnallite precipitation.

New processes of removing magnesium from lithium containing brines without loss of lithium are required.

SUMMARY OF THE INVENTION

The present invention relates in part to an improved process which reduces the number of major processing steps for producing chemical (technical) grade and low sodium lithium carbonate and lithium chloride directly from natural lithium containing brines concentrated to about 6.0 wt % Li without the lithium hydroxide monohydrate single and double recrystallization steps present in the processes of the prior art, while also reducing the loss of lithium during magnesium precipitation, and by adding a solution of potassium chloride to the brine to even further reduce magnesium levels in the brine so that the magnesium is precipitated as bischofite and carnallite, without or with reduced precipitation as lithium carnallite. The KCl solution is preferably from about 1 wt. % to 20 wt. % KCl, more preferably from about 2 to 15 wt. % KCl, and most preferably from 5 to 10 wt %. The term "purified brine" as used in connection with this invention means a lithium containing brine that has had magnesium removed by addition of a sufficient amount of a KCl solution to precipitate at least some of the magnesium present in the brine as carnallite.

All ranges described herein include the set of all real numbers between and including the lowest and highest reported endpoints of the range for a given property, quantity, percentage, etc. For Example, a range of from 1 to 10 percent would include all of the digits 1 through 9, as well as 5.002, 8.88888888, 2.1, etc. as can be easily understood by one of skill in the art.

The present invention also relates to an improved method for preparing chemical grade lithium salts such as lithium carbonate and lithium chloride directly from the same concentrated starting brine with reduced magnesium content as that used to prepare technical grade lithium carbonate.

Claims of the present invention are related to a process for reducing the amount of magnesium in a lithium-containing brine comprising adjusting the brine to a lithium content of from 4.5 to 6.9 wt % and adding a sufficient amount of a solution of KCl to the adjusted brine to precipitate magnesium as carnallite. The brine may be further concentrated to precipitate additional magnesium as carnallite. KCl solution is added as necessary to precipitate the magnesium.

In a preferred embodiment, the Mg/Li weight ratio of brine is decreased below the ratio that is achievable via concentration only by evaporation. Preferably, the Mg/Li weight ratio of the brine is adjusted to a range of from 0.1 to 0.22 at greater than or equal to 5.7% Li.

The Mg/Li weight ratio is decreased in an evaporation pond, or in a laboratory or industrial setting in a pipe, tank, test tube, or any other type of conduit, container or vessel.

Some lithium may be precipitated as lithium carnallite, but in a lesser amount than when the Mg/Li weight ratio is not adjusted below 0.22.

The process may further include the step of removing magnesium as the carbonate or hydroxide salt, e.g., by addition of an alkali metal hydroxide, e.g., NaOH.

There may be a loss of lithium due to entrainment within muds that result from precipitation of magnesium salts such as the carbonate or hydroxide salts, but loss of lithium is less than when magnesium is not removed as carnallite by addition of said KCl solution.

The purified brine having the magnesium removed at least in part as carnallite by addition of a KCl solution may be used to prepare various lithium salts. For example, lithium carbonate may be prepared by a continuous process for directly preparing high purity lithium carbonate from lithium containing brines comprising: preparing a brine containing about 6.0 wt % lithium and further containing other ions naturally occurring in brines; adding a solution of KCl to precipitate magnesium as carnallite; removing boron in an extraction step; adding mother liquor containing carbonate from a prior precipitation step to precipitate magnesium as magnesium carbonate; adding a solution of CaO and sodium carbonate to remove calcium and residual magnesium; precipitating lithium carbonate from the purified brine by adding soda ash solution; filtering the resultant solution to obtain solid lithium carbonate; preparing an aqueous slurry of the lithium carbonate in a reactor equipped with an inlet for introducing carbon dioxide gas and introducing carbon dioxide gas through the inlet into said aqueous slurry to form an aqueous lithium bicarbonate solution, the reactor being at a temperature in the range of −10 to +40° C.; passing said aqueous lithium bicarbonate solution through a filter to clarify the solution and optionally an ion exchange column for further calcium and magnesium removal; introducing said filtered lithium bicarbonate solution into a second reactor and adjusting the temperature of the solution to from 60 to 100° C. to precipitate ultra-pure lithium carbonate; and filtering, optionally washing, and drying the ultra-pure lithium carbonate having sodium less than 0.0002 wt %, calcium less than 0.00007 wt %, and magnesium less than 0.00001 wt %. In a preferred embodiment, the lithium bicarbonate solution is only passed through a filter and proceeds to the second reactor at 60 to 100° C. to precipitate low sodium lithium carbonate with a sodium content of less than 0.0002 wt %. In another preferred embodiment, the temperature in the first reactor is from −5 to +35° C., and the temperature of the reactor for precipitating high purity lithium carbonate is from 70 to 95° C.

Lithium carbonate can be prepared by a continuous process for directly preparing high purity lithium carbonate from lithium containing brines comprising: preparing a brine containing about 6.0 wt % lithium and further containing other ions naturally occurring in brines; adding a solution of KCl to precipitate magnesium as carnallite; removing boron in an extraction step; adding mother liquor containing carbonate from a prior precipitation step and soda ash solution to precipitate magnesium carbonate; filtering to remove magnesium carbonate; adding CaO and soda ash to remove magnesium and calcium and to yield a purified lithium containing brine; adding soda ash solution to said purified brine to precipitate lithium carbonate; filtering the solution to recover the precipitated lithium carbonate, preparing an aqueous lithium carbonate slurry in a reactor where such reactor is equipped with an inlet for introducing carbon dioxide gas and introducing carbon dioxide gas through the inlet into the lithium carbonate slurry to produce an aqueous lithium bicarbonate solution, wherein the reactor is at a temperature in the range of −10 to +40° C.; passing the aqueous lithium bicarbonate solution through a clarifying filter and optionally an ion exchange column for further calcium and magnesium removal; introducing the filtered solution into a second reactor and adjusting the temperature of the solution to from 60 to 100° C. to precipitate the ultra-pure lithium carbonate; and filtering, optionally washing, and drying the ultra-pure lithium carbonate having sodium less than 0.0002 wt %, calcium less than 0.00007 wt % and magnesium less than 0.00001 wt %. Preferably the lithium bicarbonate is only passed through a filter and proceeds to the second reactor at 60 to 100° C. to precipitate low sodium lithium carbonate with a sodium content of less than 0.0002 wt %. The temperature in the first reactor is preferably −5 to +35° C., and the temperature of the reactor for precipitating high purity lithium carbonate is preferably from 70 to 95° C. The method is preferably conducted such that the lithium bicarbonate solution is at greater than or equal to atmospheric pressure when below ambient temperature. The final product will preferably contain less than 20 ppm sodium as an impurity, and more preferably less than 2 ppm.

Purified lithium carbonate comprising greater than 99.4 wt. % $Li_2CO_3$; less than 0.0007 wt. % Mg; less than 0.0010 wt. % Na; less than 0.00025 wt. % K; less than 0.0120 wt. % Ca; less than 0.0001 wt. % B; less than 0.0002 wt. % Al; less than 0.0001 wt. % As; less than 0.0001 wt. % Fe; less than 0.0010 wt. % Si; less than 0.00005 wt. % Zn; less than 0.037 wt. % $SO_4$; and less than 0.005 wt. % Cl may be prepared by a continuous process for directly preparing high purity lithium carbonate from lithium containing brines comprising: preparing a brine containing about 6.0 wt % lithium and further containing other ions naturally occurring in brines; adding a solution of KCl to precipitate magnesium as carnallite; removing boron by an extraction step; adding mother liquor containing carbonate from a prior precipitation step and soda ash solution to precipitate magnesium carbonate; filtering to remove magnesium carbonate; adding CaO and soda ash solution to remove magnesium and calcium and to yield a purified lithium containing brine; adding soda ash to said purified brine to precipitate lithium carbonate; filtering the solution to recover the precipitated lithium carbonate, preparing an aqueous lithium carbonate slurry in a reactor where such reactor is equipped with an inlet for introducing carbon dioxide gas and introducing carbon dioxide gas through the inlet into the lithium carbonate slurry to produce an aqueous lithium bicarbonate solution, wherein the reactor is at a temperature in the range of −10 to +40° C.; passing the aqueous lithium bicarbonate solution through a clarifying filter and optionally an ion exchange column for further calcium and magnesium removal; introducing the filtered solution into a second reactor and adjusting the temperature of the solution to from 60 to 100° C. to precipitate the ultra-pure lithium carbonate; and filtering, optionally washing, and drying the ultra-pure lithium carbonate.

Lithium carbonate having greater than 99.995 wt. % $Li_2CO_3$; less than 0.00001 wt. % Mg; less than 0.0002 wt. % Na; less than 0.00015 wt. % K; less than 0.00007 wt. % Ca; less than 0.0001 wt. % B; less than 0.0002 wt. % Al; less than 0.0001 wt. % As; less than 0.0001 wt. % Fe; less than 0.00011 wt. % Si; less than 0.000014 wt. % Zn; less than 0.0030 wt. % $SO_4$; and less than 0.005 wt. % Cl may be prepared by a continuous process for directly preparing high purity lithium carbonate from lithium containing brines comprising: preparing a brine containing about 6.0 wt % lithium and further containing other ions naturally occurring in brines; adding a solution of KCl to precipitate magnesium as carnallite; removing boron in an extraction step; adding mother liquor containing carbonate from a prior precipitation step and soda ash solution to precipitate magnesium carbonate; filtering to remove magnesium carbonate; adding CaO and soda ash solution to precipitate magnesium and calcium and to yield a purified lithium containing brine; adding soda ash to said purified brine to precipitate lithium carbonate; filtering the solution to recover the precipitated lithium carbonate; preparing an aqueous lithium carbonate slurry in a reactor where such reactor is equipped with an inlet for introducing carbon dioxide gas and introducing carbon dioxide gas through the inlet into the lithium carbonate slurry to produce an aqueous lithium bicarbonate solution, wherein the reactor is at a temperature in the range of −10 to +40° C.; passing the aqueous lithium bicarbonate solution through a clarifying filter and optionally an ion exchange column for further calcium and magnesium removal; introducing the filtered solution into a second reactor and adjusting the temperature of the solution to from 60 to 100° C. to precipitate the ultra-pure lithium carbonate; and filtering, optionally washing, and drying the ultra-pure lithium carbonate.

Lithium chloride can be produced by the process of:
preparing a brine containing about 6.0 wt % lithium, and further containing magnesium, calcium and sulfate;
adding KCl solution to remove magnesium as carnallite;
extracting to remove boron;
adding CaO or $Ca(OH)_2$ to the brine to coprecipitate magnesium and calcium;
adding barium to remove sulfate by precipitating barium sulfate;
adding oxalate to remove remaining calcium by precipitating calcium oxalate;
adjusting the final pH of the brine to about 7.0;
concentrating the brine to evaporate water and to precipitate lithium chloride;
filtering, optionally washing, and drying the lithium chloride.

Lithium chloride can be produced by a process comprising: preparing high purity lithium chloride by reacting lithium carbonate having a sodium content of less 0.002 wt % with hydrochloric acid having less that 1 ppm sodium to produce high purity lithium chloride having a sodium content of less than 0.001 wt %, wherein some of the magnesium is precipitated as carnallite from a brine used to prepare the lithium chloride by adding a KCl solution.

Purified lithium carbonate may be prepared in an apparatus for continuously purifying lithium carbonate, wherein the apparatus comprises: a dissolver to dissolve lithium carbonate that includes a mixer/disperser, a carbon dioxide gas dispersion tube, a wash water filtrate/mother liquor filtrate recycle line, a cooler, a stilling well to separate gas and undissolved lithium carbonate solids from the resultant lithium bicarbonate solution, a continuous chemical grade lithium carbonate crystal feeder; an inline filter to remove insoluble impurities from the lithium bicarbonate solution coming from the stilling well; a heat exchanger to recover heat from the hot mother liquor that is recycled to the dissolver; a heated gas sealed crystallizer with mixer to decompose the lithium bicarbonate solution to form low sodium lithium carbonate crystals, carbon dioxide gas, and mother liquor; a slurry valve to remove the low sodium lithium carbonate crystals and mother liquor from the gas sealed crystallizer; a gas line to continuously return the carbon dioxide produced in the crystallizer to the dissolver; a separator to separate the low sodium lithium carbonate from the mother liquor and a wash water section to wash the lithium carbonate crystals; a pump and line to return the mother liquor and wash filtrate to the dissolver; a mother liquor bleed to control the sodium level and to maintain a constant liquid volume; and a carbon dioxide source, wherein some of the magnesium in the brine used to produce the chemical grade lithium carbonate may be removed by precipitation as carnallite by addition of a KCl solution. Preferably the lithium carbonate is prepared using a reactor with absorption columns to facilitate absorption of carbon dioxide. The absorption column may be a sieve tray or a Schiebel column.

In a particularly preferred embodiment, the invention relates to a continuous process for directly preparing high purity lithium compounds from lithium containing brines by preparing a brine containing from at least 4.5 to about 6.5 wt % lithium by obtaining a natural brine or feed source that contains both lithium and magnesium, wherein the lithium content of the natural brine or feed is less than 4.5 wt. % lithium, and concentrating the natural brine or feed to a lithium content of from about 4.5 to about 6.5 wt. % lithium, and more preferably from 4.7 to 5.9 wt. %. The natural brine or feed may also contain other ionic impurities, e.g., sodium, calcium, borates, and sulfates that are typically found to be naturally occurring in brines. After the lithium and magnesium containing brine or feed is concentrated to a lithium content of from 4.5 to 6.5 wt. % lithium, KCl solution of from 1 to 20 wt. % KCl, preferably about 2 to 15 wt. % KCl, and more preferably from about 5 to 10 wt. % KCl is added to the brine in an amount sufficient to precipitate magnesium as carnallite. Preferably the KCl solution is a waste stream from the lithium recovery process so that KCl solution will not have to be separately prepared and provided to the process. In other words, a continuous supply of KCl to the process, which also results as part of the lithium recovery process, is desirable.

The precipitated carnallite may be removed during the process, e.g., by removing the lithium brine to another solar pond, or by dredging the bottom of the pond using commercially viable means.

Once the magnesium level is reduced as far as possible, e.g., to the range of ppm, e.g., less than 20 parts per million, and preferably less than 0.0005 wt. %, or lower, e.g., 0.00001 wt. %, the lithium brine may then be subjected to recovery processes to recover very pure lithium salts, e.g., lithium chloride and/or lithium carbonate, or lithium metal.

In preferred embodiments, the mother liquor containing carbonate, preferably from a prior precipitation step to precipitate magnesium or calcium as magnesium carbonate or calcium carbonate, respectively, may be added to LiCl brine to remove some of the calcium and magnesium that may remain. Preferably such a precipitation process would be performed after KCl solution is added to remove some magnesium as carnallite. Other ions may be removed by addition of counterions that will form insoluble salts, e.g., an oxalate solution may be added to further remove calcium; a barium salt solution may be added to remove any sulfate; or, in other embodiments, the lithium brine may be passed through an ion exchange column for further purification from divalent and trivalent cations. Preferably non-magnesium impurities are removed prior to addition of the KCl solution to remove magnesium as carnallite, but this is not a requirement.

Other impurities can be removed from a lithium containing brine via different processing steps. For example, a lithium containing brine that contains sodium can be cooled to a temperature below 0° C. to reduce the sodium content to not more than 0.05 wt % Na to produce a purified brine, which can be subjected to a crystallization step to produce high purity lithium chloride crystal. Natural temperature fluctuations may also be relied upon to precipitate impurities from the brines.

Alternatively, purified brine having magnesium removed by addition of a KCl solution can be used to produce ultrapure lithium carbonate by precipitating lithium carbonate from the purified brine; preparing an aqueous slurry of lithium carbonate in a reactor, where such reactor is equipped with a method of introducing absorption of carbon dioxide gas; such reactor is at a temperature of about −10 to +40° C.; passing the aqueous bicarbonate solution through a filter and ion exchange column for further calcium and magnesium removal; introducing said solution into a second reactor at a temperature from 60 to 100° C.; and precipitating the ultrapure lithium carbonate with sodium less than 0.0002 wt %.

The invention also relates to a process for improving the Mg to Li weight ratio of the solar evaporated brine through the addition of KCl as a solution to brine to induce additional precipitation of Mg as carnallite, $KCl \cdot MgCl_2 \cdot 6H_2O$.

The invention also relates to a process for preparing high purity lithium chloride from the purified brine of the present invention by preparing low sodium lithium carbonate having a sodium content of less than 0.0002 wt %, and reacting the lithium carbonate having a sodium content of less than 0.0002 wt % with hydrochloric acid having less than 0.15 ppm sodium to produce high purity lithium chloride having sodium content of less than 0.001 wt %.

A preferred cation exchange resin is Lewatit MonoPlus TP 208 resin commercially available from Lanxess Europe GmbH, Germany. One of skill in the art would understand that other cation exchange resins that are selective for alkaline earth cations can be used in accordance with the present invention.

Another aspect of the invention relates to recovery of lithium carbonate salt which is extremely pure. This can be done by feeding the solution of technical grade lithium carbonate into an apparatus for continuously purifying lithium carbonate having a dissolver which is a baffled reactor to dissolve lithium carbonate that includes a mixer/disperser, a carbon dioxide gas dispersion tube, a wash water filtrate/mother liquor filtrate recycle line, a cooler, a stilling well to separate gas and undissolved lithium carbonate solids from the resultant lithium bicarbonate solution, and a continuous chemical grade lithium carbonate crystal feeder; an inline filter to remove insoluble impurities from the lithium bicarbonate solution coming from the stilling well; a heat exchanger to recover heat from the hot mother liquor that is recycled to the dissolver; a heated gas sealed crystallizer with mixer to decompose the lithium bicarbonate solution to form low sodium lithium carbonate crystals, carbon dioxide gas, and mother liquor; a slurry valve to remove the low sodium lithium carbonate crystals and mother liquor from the gas sealed crystallizer; a gas line to continuously return the carbon dioxide produced in the crystallizer to the dissolver; a separator such as a continuous belt filter to separate the low sodium lithium carbonate from the mother liquor and a wash water section to wash the lithium carbonate crystals; a pump and line to return the mother liquor and wash filtrate to the dissolver; a mother liquor bleed to control the sodium level and to maintain a constant liquid volume; and a carbon dioxide make-up source. In preferred embodiments, the apparatus has a reactor that uses absorption columns, such as sieve tray or Scheibel columns, to facilitate absorption of carbon dioxide.

The invention also relates to the purified lithium salts, e.g., lithium chloride and lithium carbonate, prepared from the purified brines which are prepared as described above. Purified lithium carbonate according to the invention has 25 ppm max Na. Preferably, potassium is less than 20 ppm, calcium is not greater than 140 ppm, and magnesium is less than 20 ppm. It is also preferred that not greater than 100 ppm sulfate ($SO_4^-$) be present.

In a particularly preferred embodiment, purified lithium carbonate is produced having the following content.

TABLE 2

| wt % | Low Sodium $Li_2CO_3$ |
| --- | --- |
| $Li_2CO_3$ | >99.4 |
| Mg | 0.0005-0.0002 |
| Na | 0.0010-0.0002 |
| K | 0.00015-0.00010 |
| Ca | 0.0140-0.0120 |
| B | <0.0001 |
| Al | <0.0002 |
| As | <0.0001 |

TABLE 2-continued

| wt % | Low Sodium $Li_2CO_3$ |
|---|---|
| Fe | <0.0001 |
| Si | <0.0010 |
| Zn | <0.00005 |
| $SO_4$ | 0.0030 to 0.037 |
| Cl | <0.005 |

Another preferred lithium carbonate has the following composition:

TABLE 3

| Wt % | High Purity $Li_2CO_3$ |
|---|---|
| $Li_2CO_3$ | >99.995 |
| Mg | <0.00001 |
| Na | <0.0002 |
| K | 0.00015 |
| Ca | 0.00007 |
| B | <0.0001 |
| Al | <0.0002 |
| As | <0.0001 |
| Fe | <0.0001 |
| Si | <0.00011 |
| Zn | <0.000014 |
| $SO_4$ | 0.0030 |
| Cl | <0.005 |

Purified lithium chloride according to the present invention preferably has less than 20 ppm sodium as an impurity, and more preferably 8 ppm or less.

Any patents and references cited herein are incorporated by reference in their entireties.

DETAILED DESCRIPTION OF THE INVENTION

Figure 1:
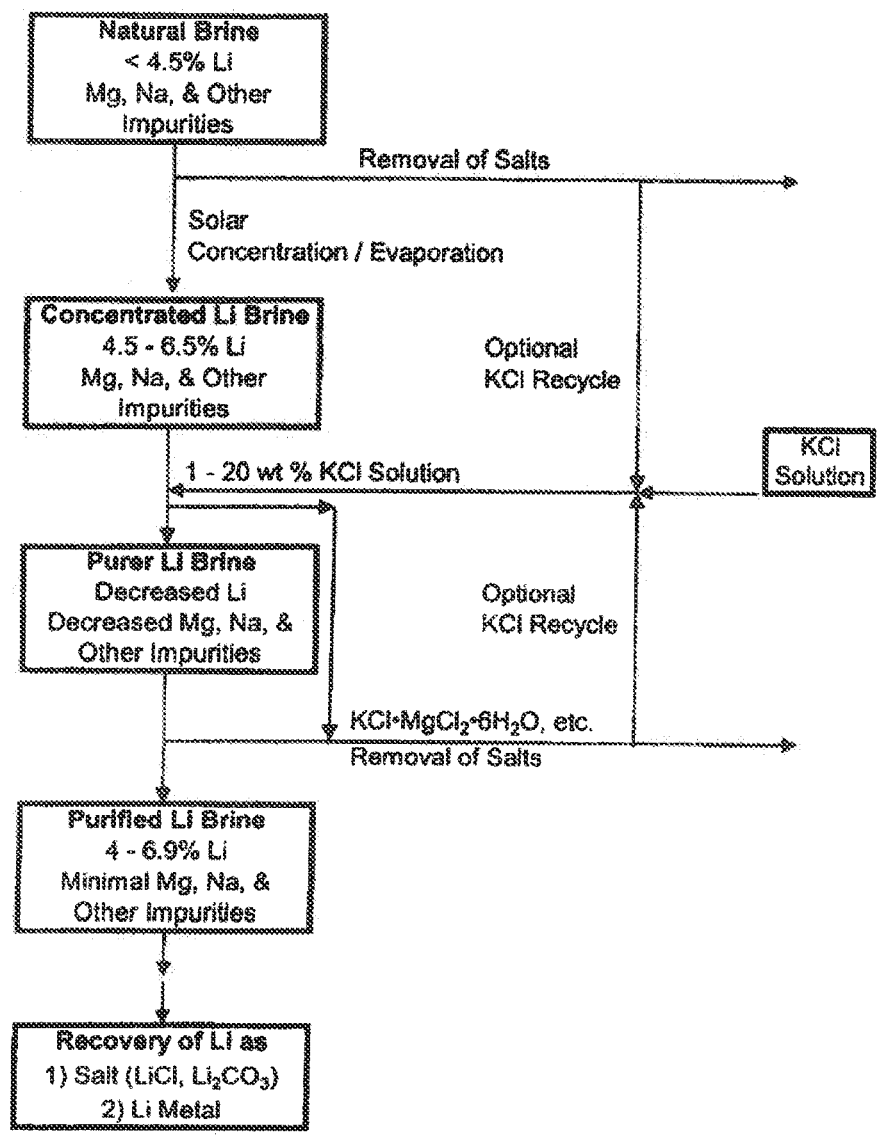
FIG. 1 is a flow diagram showing the removal of magnesium from a lithium brine by addition of aqueous KCl.

The following describes in detail the process for reducing the magnesium content of a lithium containing brine. First, a natural or artificial brine source, e.g., from lithium battery production, is provided and tested for magnesium content. If magnesium is present, the brine is concentrated, if necessary, to a lithium content of from 4.5 to 6.6 wt. % lithium. Concentration can be by solar evaporation or any other means known in the art, e.g., heating to evaporate water and concentrate the solution.

The present invention incorporates, among other things, the process described in U.S. Pat. No. 5,219,550 to produce a chemical grade lithium carbonate to specifically utilize the mother liquor by-product stream from that process to recover lithium from the magnesium containing purification muds that are formed when producing lithium chloride directly from brine, eliminating the steps of first precipitating lithium carbonate or lithium hydroxide and then transforming these salts to lithium chloride. Additionally, the process of the invention yields a high purity lithium carbonate having less than about 0.002 wt % sodium using a carbon dioxide/bicarbonate cycle, and a process of preparing a high purity lithium chloride by reacting the high purity lithium carbonate with a high purity hydrochloric acid.

A sufficient amount of a 1 to 20 wt. % solution of KCl is added to the concentrated lithium brine so that the magnesium precipitates as the carnallite salt, some initially and some upon further concentration of the solution. The carnallite salt is then removed, e.g, by conducting this step in a precipitation tank, or by transferring, e.g., by pumping the lithium brine to an adjacent pond so that the carnallite can be recovered by, e.g., shoveling or raking. The KCl solution can be added by, e.g., spraying the solution onto a solar evaporation pond, or by adding it into a test tube, beaker, or other vessel containing the concentrated lithium brine.

Other ionic impurities can be removed either before or after addition of the KCl to precipitate the magnesium as carnallite salt. For example, calcium salts may be precipitated by adding carbonate, hydroxide, or perhaps oxalate ion. Other methods of removing various ions will be known to those of skill in the art or may be hereafter invented.

There are different chemical compositions of brine that exist in nature and contain lithium (see Table 1, supra). For example, in the Salar de Atacama basin two different types of lithium containing brine exist. These are described as high sulfate brine and high calcium brine. Sulfate may be removed from the brine by adding either lime or a calcium chloride by-product from another source, or mixing with a brine containing calcium to precipitate the calcium and sulfate as gypsum ($CaSO_4.2H_2O$). This produces a low calcium, low sulfate brine that can be solar concentrated and have a higher lithium yield than concentrating a brine containing sulfate or calcium. Decreasing the sulfate in the brine also allows for better recoveries of potash from brines that naturally contain potassium.

The natural brine is concentrated to a lithium content of at least 4.5%, e.g. 4.5 to 7.0%, by solar evaporation. During the solar evaporation process, gypsum continues to co-precipitate with sodium chloride when sulfate and calcium are stoichiometrically balanced. With continued evaporation, potassium chloride and sodium chloride precipitate until the lithium and magnesium concentrations increase to about 0.76 wt % Li and 5.2 wt % Mg. Concentrating this brine from 0.76 to 1.4 wt % Li precipitates the carnallite salt ($KCl.MgCl_2.6H_2O$). This reduces the Mg:Li ratio in solution from about 6.8:1 to 5.1:1, and removes most of the sodium and potassium from solution. Continued evaporation and concentration of the brine from 1.4 to 4.2 wt % Li precipitates the bischofite salt ($MgCl_2.6H_2O$). This further reduces the Mg:Li ratio to 0.93:1.

At approximately this point during the process, a solution of KCl is added to precipitate some of the additional Mg ion as carnallite salt, because if it is not added the magnesium will now begin to precipitate as lithium carnallite, thus reducing the amount of lithium recoverable from the solution. Nearly all of the remaining magnesium precipitates as carnallite upon further concentration of the brine. Preferably, an excess of KCl (relative to the Mg in the brine) is used to precipitate the additional carnallite salt ($KCl \cdot MgCl_2 \cdot 6H_2O$). This further reduces the Mg:Li ratio to about 0.15-0.22. This concentration of the brine from about 4.2 wt % Li to about 6.5 to 6.9 wt % Li also precipitates some lithium carnallite salt ($LiCl \cdot MgCl_2 \cdot 7H_2O$), but much less of this salt precipitates than when the KCl solution is not added. The loss of lithium to lithium carnallite precipitate is decreased by about 90%.

To improve the lithium yield when concentrating the brine to about 6 wt % lithium, any lithium precipitated from brine as lithium carnallite can be converted to the bischofite salt and lithium chloride brine by mixing the lithium carnallite salt with brine containing less than 3 wt % Li. The process of the current invention, however, minimizes formation of lithium carnallite, as the lithium remains soluble and in solution when the KCl solution is added to the concentrated brine. In order to convert 100% of lithium carnallite to bischofite, the resultant recovered brine contained in the bischofite salt ponds must not exceed a lithium concentration of 4.2 wt % Li.

Magnesium polyborates may also precipitate slowly from the concentrated brines. This usually causes the boron salts to supersaturate when the brine residence time in the ponds is short. As a result, the boron content of the brines can range from 0.5 to 1.2 wt % boron.

At ambient conditions, the concentrated brine will contain on the average:
6.6±0.3% Li
1.3±0.3% Mg
0.08% Na
0.02% K
0.033% Ca
0.019% $SO_4$
0.8±0.2% B
35±0.5% Cl Natural brines containing lithium, magnesium, potassium, sodium, and boron, wherein calcium and sulfate are stoichiometrically balanced, will have this general composition when evaporated and concentrated under ambient conditions by solar evaporation and with the benefit of the appropriate addition of KCl solution per the present invention.

The boron and magnesium remaining in brine concentrated to about 6 wt % Li must be removed in order to make suitable lithium carbonate or lithium chloride products. It is preferred that boron be removed by an alcohol extraction such as described in U.S. Pat. No. 5,219,550, hereby incorporated by reference in its entirety. This extraction process reduces the boron in the concentrated brine to less than about 0.0005 wt % B.

The procedures formerly known in the art for directly removing magnesium from concentrated brine as magnesium hydroxide are generally costly because valuable lithium is retained by magnesium hydroxide which forms as a voluminous precipitate which is difficult to filter. Although not preferred, such methods can be used in combination with the removal of Mg as the carnallite salt by adding a KCl solution as described herein. When such methods are used, to achieve maximum lithium yields and facilitate filtration, the magnesium may be removed in two steps. As much as 97% of the magnesium may be removed as magnesium carbonate ($MgCO_3$) by mixing the concentrated brine with recycled mother liquor from the lithium carbonate precipitation step. This utilizes the carbonate present in the lithium carbonate crystallizer mother liquor and recovers most of the lithium that remains soluble in the mother liquor.

When recycling mother liquor, it is important to carefully control the $CO_3$/Mg ratio to prevent lithium carbonate from precipitating with the magnesium carbonate. This is because the lithium concentration at this point in the process may be high (0.5 to 1.2 wt % Li), but this becomes less problematic at lower lithium concentrations, e.g., at about 1.0%. After the magnesium carbonate is precipitated and filtered, the magnesium carbonate solids (muds) are given a displacement wash using lithium carbonate mother liquor to recover some of the concentrated brine retained with the magnesium carbonate solids. Using mother liquor as the wash instead of water reduces the water input to the process and the volume of liquid that must be removed as a process bleed stream. The mother liquor constitutes the process bleed whereby all the water (from brine and wash water) and sodium chloride (from soda ash reaction with lithium chloride) are continuously removed from the process and which contains about 5% of the total lithium in the concentrated feed brine. The washed muds contain between 5 and 12% of the total lithium input and constitute a major lithium loss for the process in addition to the lithium lost with the process bleed.

The magnesium remaining in the brine (generally from 0.02 to 0.06 wt % Mg) is finally removed by treating the brine with a lime/soda ash ($CaO/Na_2CO_3$) slurry to form insoluble magnesium hydroxide ($Mg(OH)_2$) and insoluble calcium carbonate ($CaCO_3$). The coprecipitated $CaCO_3$ acts as a filter aid in filtering the $Mg(OH)_2$ muds. Additional filter aid may be added to further improve filtration. The lime/soda ash ratio is adjusted to control the level of soluble calcium remaining in the purified brine.

Magnesium hydroxide usually precipitates as a gel, and it is preferred to maintain the pH between 8.45 and 9.10 (measured directly with a slurry pH electrode) in order to achieve maximum filtration rates. After separation of the solids from the purified brine, the brine contains between 0.5 and 1.2% Li, less than 0.0001 wt % magnesium, less than 0.0015 wt % calcium, and less than 0.0005 wt % boron.

The magnesium-calcium-boron free brine is subsequently treated with a soda ash solution to precipitate lithium carbonate and the mother liquor is recycled as described above. The sodium added to the process as $Na_2CO_3$ is removed with the mother liquor bleed stream as dissolved sodium chloride (NaCl). Hot de-ionized water is used to wash the lithium carbonate mother liquor from the filtered lithium carbonate crystal to remove sodium and chloride. The lithium in the wash filtrate is recovered by using the wash filtrate to produce the soda ash solution.

The lithium carbonate product produced by the foregoing process is characterized as technical grade, and a typical technical grade lithium carbonate contains about 0.04 wt % sodium.

This product is a suitable source of lithium for producing chemical grade lithium carbonate having less than 0.04% Na, and subsequently, low sodium lithium chloride, without need for preparation of lithium hydroxide and the recrystallization steps of prior art processes. However, the chemical grade lithium carbonate first needs to be processed to reduce these impurities to a level suitable for producing a low sodium battery grade lithium chloride. The sodium content in low sodium lithium carbonate is reduced to below about 0.0002 wt % Na.

Figure 5:
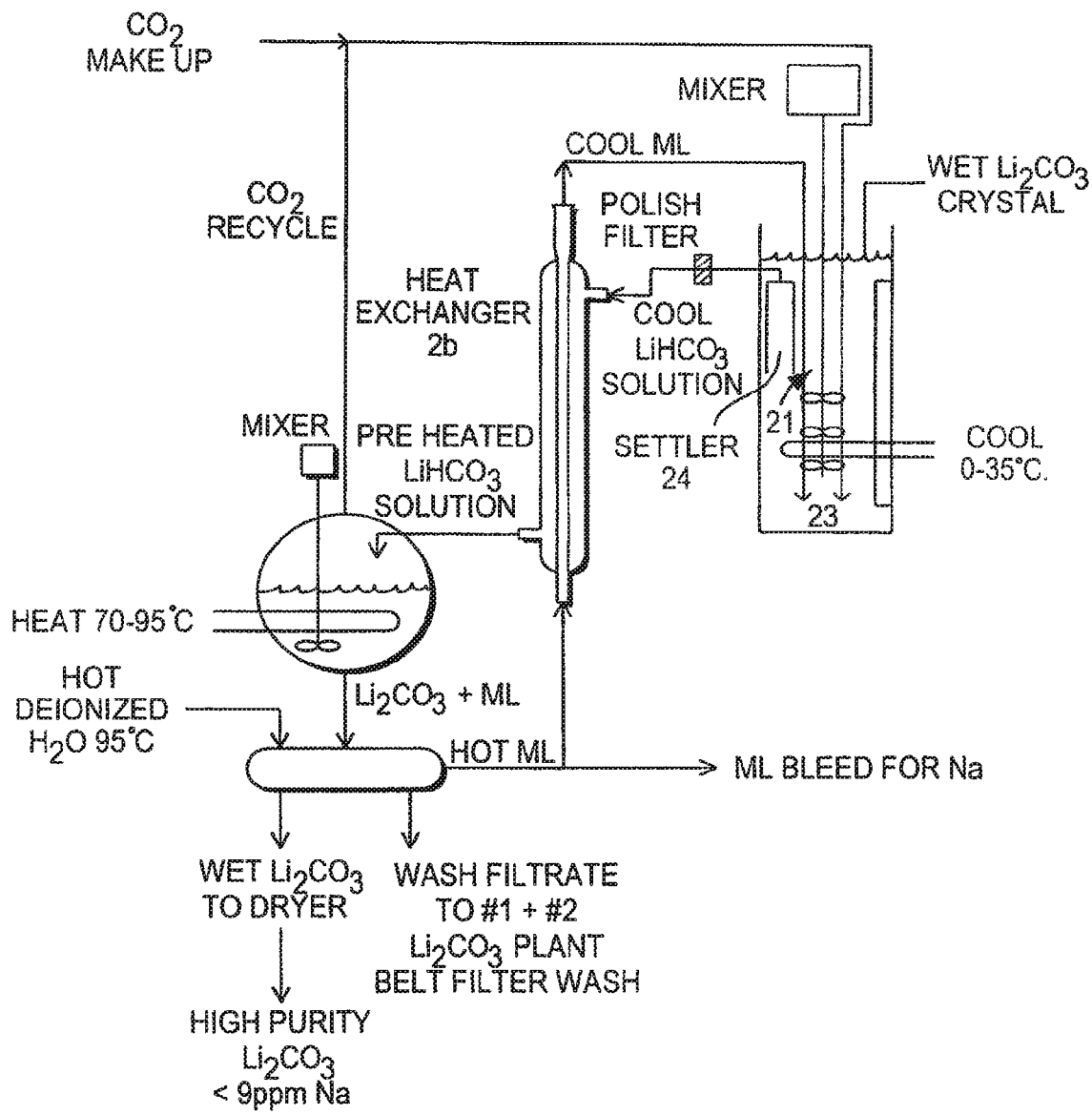
FIG. 5 is a laboratory apparatus for producing low sodium lithium carbonate according to the present invention.

Purification of the lithium carbonate to produce low sodium lithium carbonate may be conducted in a continuous reactor/crystallizer apparatus as shown in FIG. 5. The apparatus is designed to continuously dissolve lithium carbonate as lithium bicarbonate ($LiHCO_3$) by reacting a slurry (3 to 5% solids) of the technical grade lithium carbonate prepared as described above and water with $CO_2$ gas at a temperature in the range of −10 to +40° C.) in a dissolver shown as (3) in FIG. 3. The resultant $LiHCO_3$ solution (7 to 14 wt % $LiHCO_3$) is transferred on a continuous basis to a crystallizer shown as (5) in FIG. 3, which is maintained at 60 to 100° C. to precipitate high purity lithium carbonate crystals and evolve carbon dioxide gas, which may be recycled into the process. Lower temperatures may be used in the dissolver shown as (3) in FIG. 3, to increase the lithium bicarbonate concentration per cycle for purification, thereby increasing product throughput.

Figure 3:
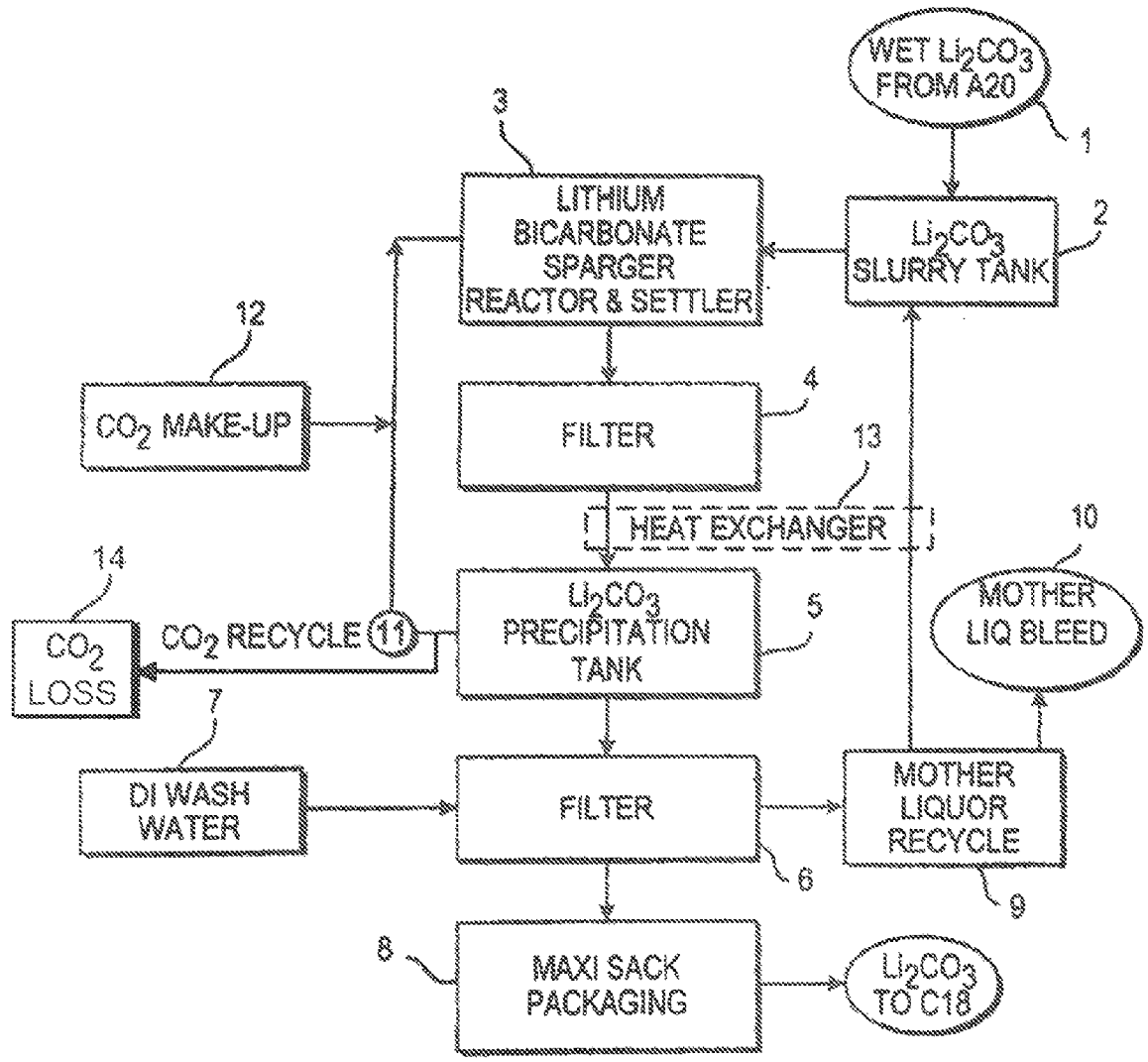
FIG. 3 is a flow diagram showing the production of low sodium lithium carbonate according to the present invention.

In the crystallizer shown as (5) in FIG. 3, high purity lithium carbonate crystals precipitate from the lithium bicarbonate solution at the higher temperature and $CO_2$ gas is evolved. The slurry is continuously removed and the lithium carbonate crystals are filtered hot and washed with hot sodium-free deionized water. The lithium carbonate mother liquor contains valuable soluble lithium and is recycled to the dissolver shown as (3) in FIG. 3, to minimize lithium loss. The source of $CO_2$ may be from the gas evolved in the crystallizer, from $CO_2$ generated when reacting lithium carbonate with hydrochloric acid, or from a commercial $CO_2$ source. Use of a commercial $CO_2$ source yields a simplified process, and does not require special added equipment to recover the $CO_2$. Furthermore, no chemical reagents are required except for sodium-free deionized water. The temperature differential between the dissolver shown as (3) in FIG. 3 and the crystallizer shown as (5) in FIG. 3, determines the maximum throughput.

The apparatus in FIG. 5 is now described in more detail. The dissolver/settler is preferably a cooled, baffled reactor with a high height-to-diameter aspect ratio containing a gas disperser/mixer designed to completely absorb $CO_2$ gas. The reactor preferably has a minimum active height of 8 feet. A settler/decanter is incorporated to eliminate undissolved solids from contaminating the clear $LiHCO_3$ solution being continuously removed from the dissolver. A baffle is preferably placed below the decanter to prevent carbon dioxide gas from entering and incapacitating the settler/decanter. The cool $LiHCO_3$ solution is polish filtered to remove insoluble impurities, then preheated with the recycled mother liquor in a heat exchanger. A cartridge filter may be incorporated prior to the heat exchanger to remove insolubles. The preheated $LiHCO_3$ solution is then transported via a pump to a heated crystallizer where it is decomposed at between 60 and 100° C. to form low-sodium lithium carbonate crystals, $CO_2$ gas, and mother liquor. The mother liquor contains dissolved lithium carbonate, sodium carbonate, and a small amount of $LiHCO_3$. The mother liquor and $CO_2$ are recycled back to the dissolver/settler reactor. Sodium is removed from the process using a mother liquor process bleed so that the mother liquor contains less than 500 ppm sodium. This limit allows lithium carbonate of the desired, low Na content to be isolated. The lithium contained in the mother liquor bleed stream can be recovered by using the bleed stream as part of the wash water used on the filtration equipment for producing technical grade lithium carbonate. The number of times the mother liquor is recycled is determined by the sodium content and the degree of purification needed.

Figure 6:
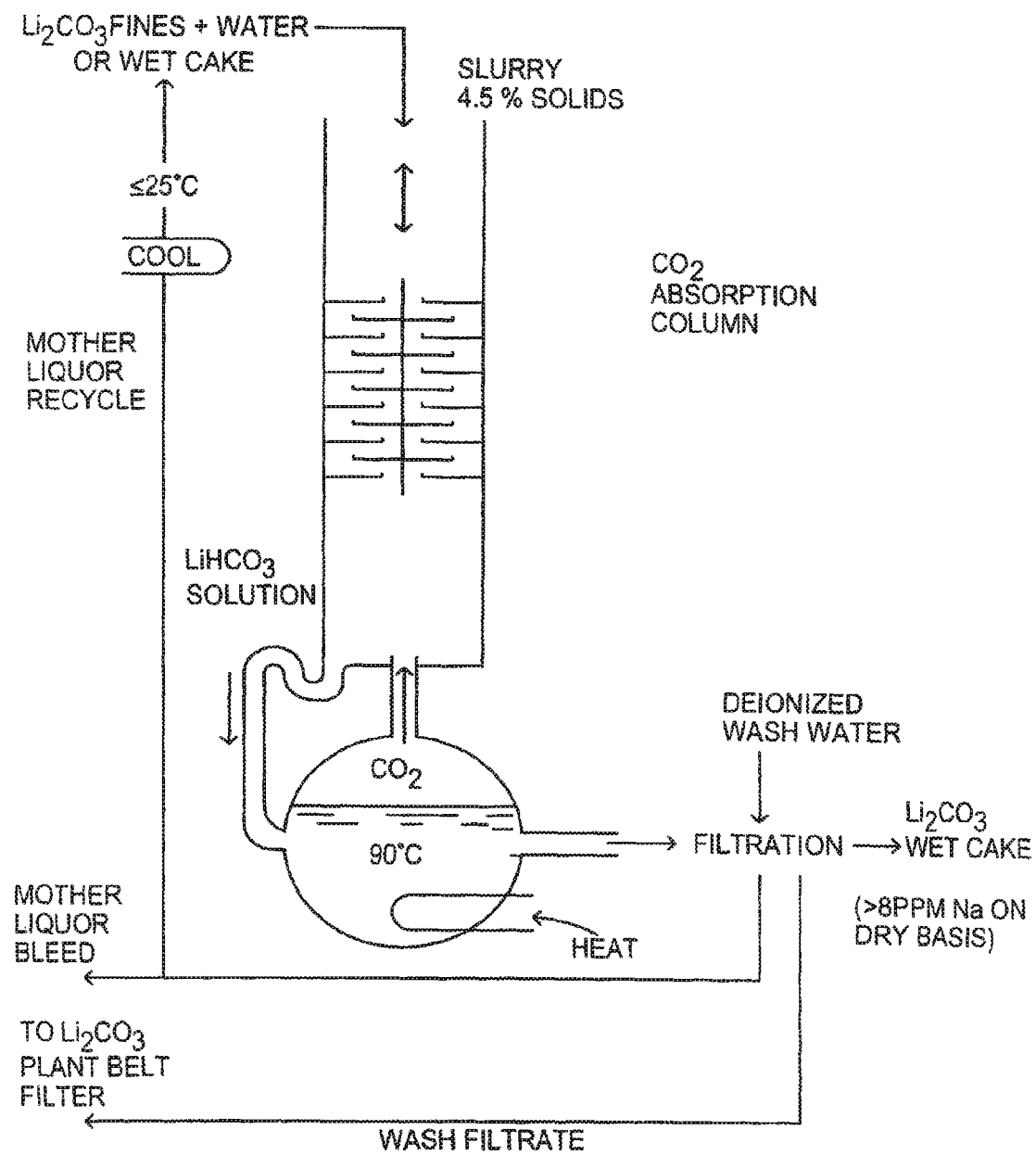
FIG. 6 is an apparatus with an absorption column for preparing the low sodium lithium carbonate according to the present invention wherein carbon dioxide from the process reaction is recycled into the absorption column.
Figure 7:
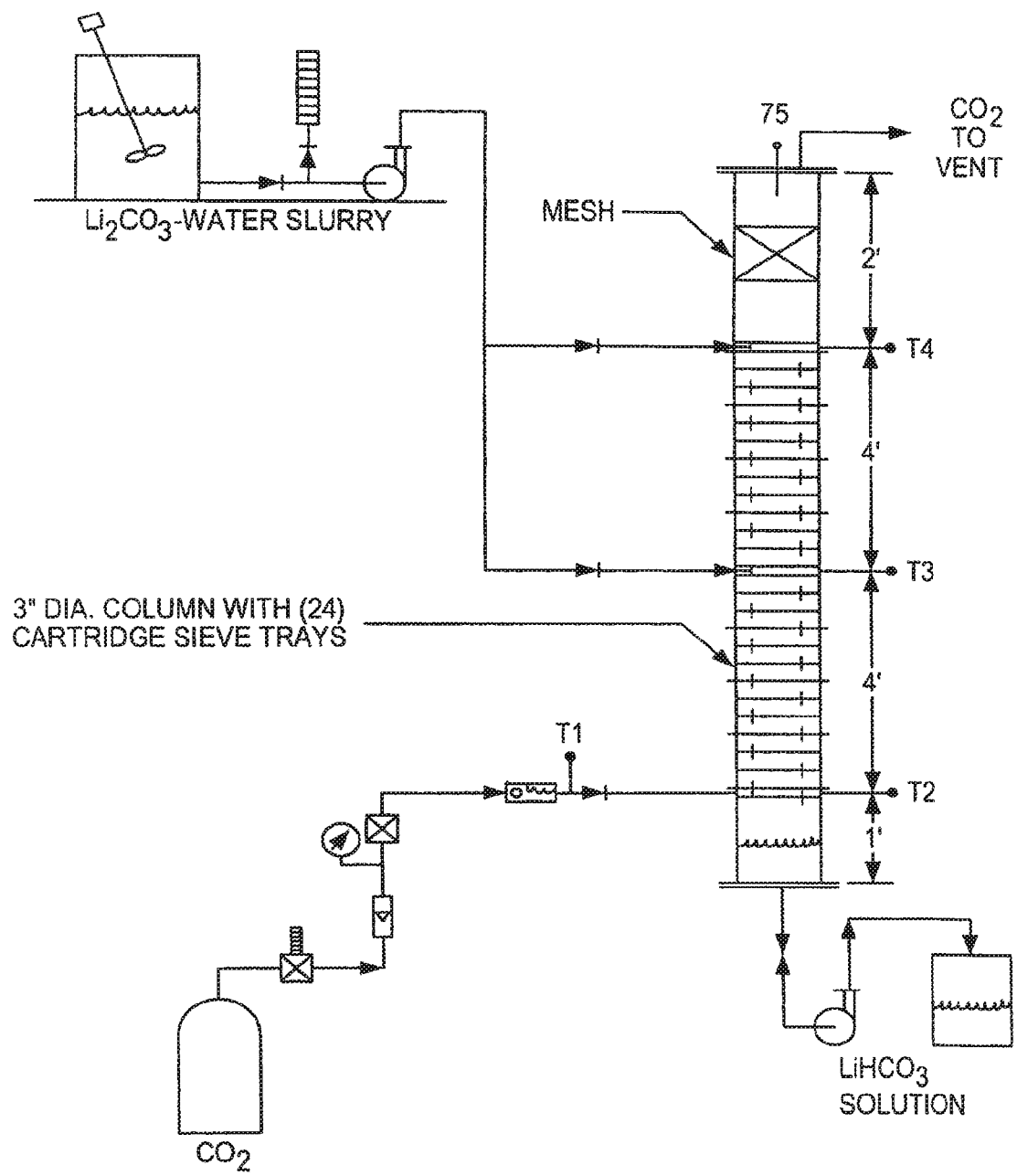
FIG. 7 shows a preferred apparatus having a sieve tray column for preparing the low sodium lithium carbonate of the present invention.
Figure 8:
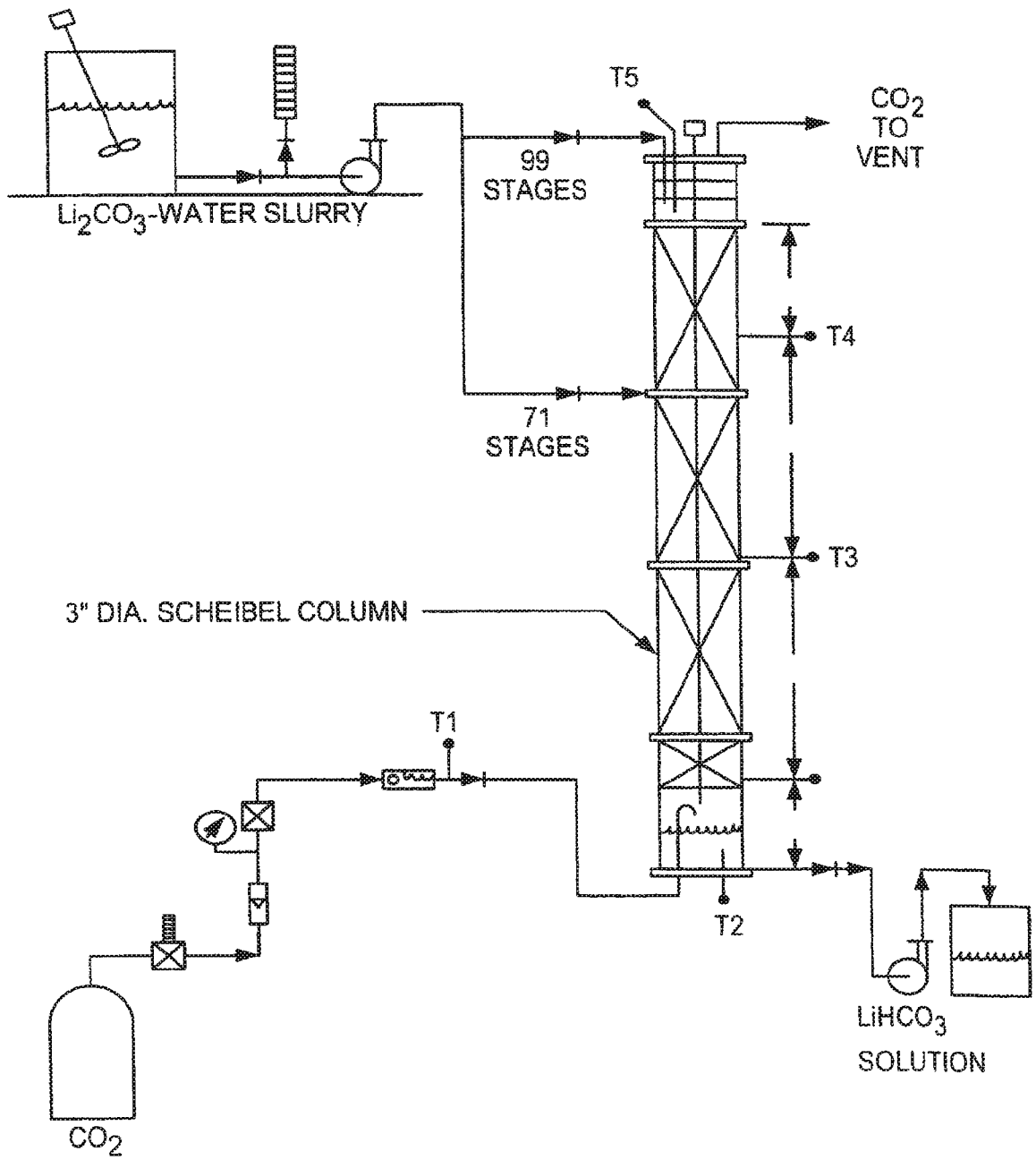
FIG. 8 shows an alternative apparatus having a Scheibel column for preparing the low sodium lithium carbonate of the present invention.

An alternative to using a dissolver/settler for the conversion of chemical grade lithium carbonate to a $LiHCO_3$ solution is to employ, for example, a carbon dioxide absorption column such as that shown in FIG. 6, a sieve tray column such as that shown in FIG. 7 or a Scheibel column (commercially available from Koch-Glitsch) such as that shown in FIG. 8.

Ultra high purity lithium can be produced by passing the $LiHCO_3$ solution through an ion exchange column prior to decomposing and recrystallizing the $Li_2CO_3$, to reduce total impurity content, preferably to less than 10 ppm. The brine may be passed through at any point during the process after the magnesium and calcium precipitation steps to remove other impurities. In a preferred embodiment, an ion exchange resin such as Lewatit MonoPlus TP208, commercially available from Lanxess, is used in the column. Prior to use, it is preferred to remove sodium from the resin, e.g. by passing HCl through the column. A lithium hydroxide solution is then run through the column to convert the resin to the lithium form. The lithium bicarbonate solution (7 to 14% $LiHCO_3$) is then passed through the column, and the purified solution is heated to 60 to 100° C. to precipitate the lithium carbonate which is washed with 95° C. deionized water. The solid is then dried to yield high purity lithium carbonate.

Table 4 shows the typical content of the lithium carbonates prepared by the processes of the invention:

TABLE 4

CHEMICAL COMPOSITION OF CHEMICAL, LOW SODIUM, AND HIGH Purity Low Sodium Lithium Carbonate

| | Chemical Grade | Low Sodium | High Purity |
|---|---|---|---|
| % $Li_2CO_3$ | 99.38 ± 0.026 | 99.4 | 99.995 |
| % Mg | 0.004 ± 0.0006 | 0.0005 ± 0.0002 | 0.00001 |
| % Na | 0.069 ± 0.005 | 0.0002 ± 0.001* | 0.0002 |
| % K | 0.0003 ± 0.00002 | 0.00015 ± 0.0001 | 0.00015 |
| % Ca | 0.014 ± 0.001 | 0.012 ± 0.0014 | 0.00007 |
| % $SO_4$ | 0.037 ± 0.003 | 0.003 to 0.037* | 0.003 |
| % B | 0.0003 ± 0.0001 | <0.0001 | <0.0001 |
| % Cl | 0.01 ± 0.006 | <0.005 | <0.005 |
| % Al | 0.0007 | 0.0002 | 0.0002 |
| % As | 0.0002 | 0.0001 | <0.0001 |
| % Fe | 0.0005 | 0.0001 | <0.0001 |
| % Si | 0.0076 | 0.001 | 0.00011 |
| % Zn | 0.0001 | 0.00005 | 0.000014 |

*function of ion concentration in mother liquor recycle

High purity lithium chloride can then be produced from the low sodium lithium carbonate by conventional reaction in solution with hydrochloric acid such as used in the prior art, except that the hydrochloric acid must have a low sodium content, e.g. 0.02 wt % sodium or less such that additional sodium is not entered into the system as a contaminant.

Figure 2:
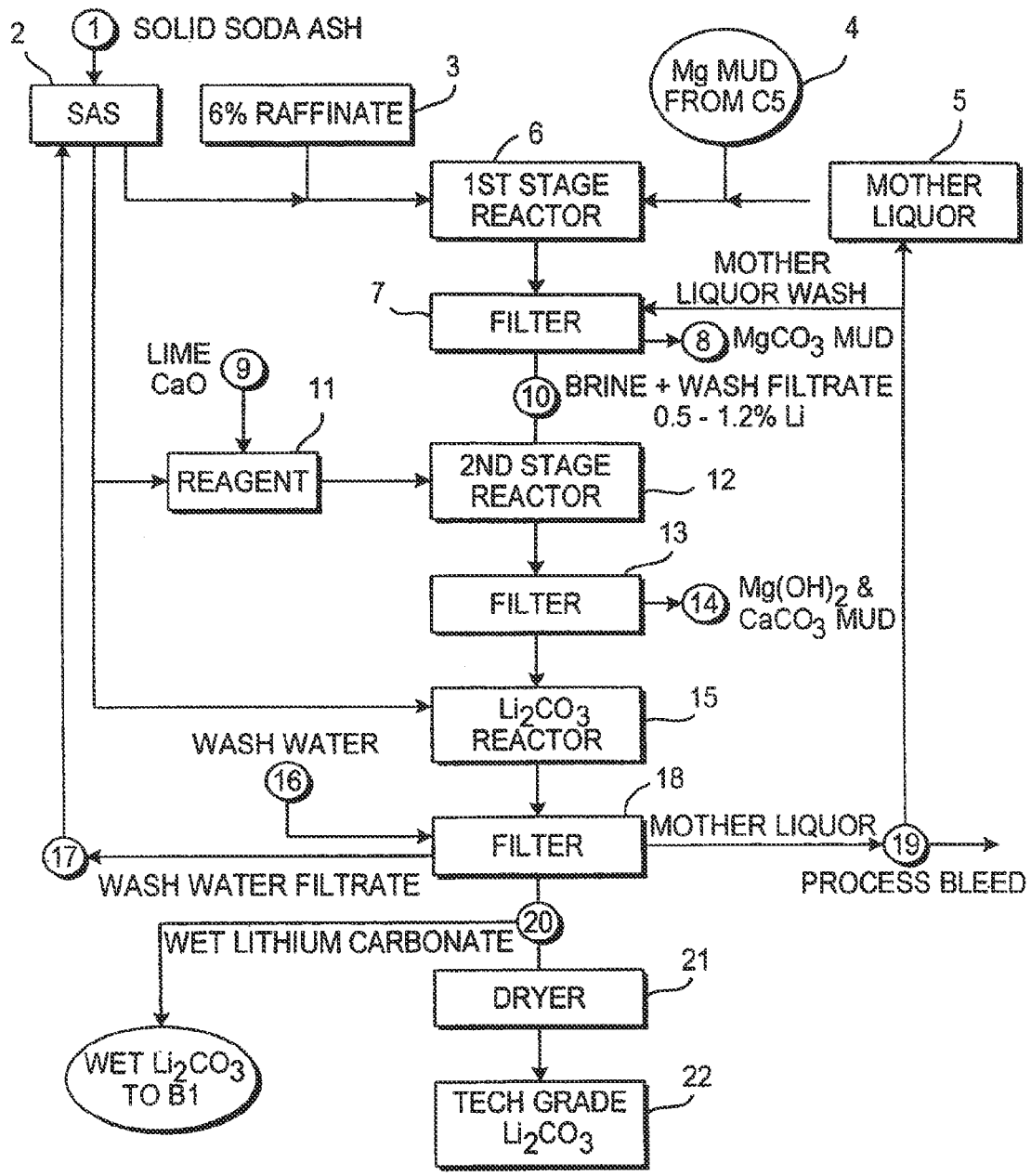
FIG. 2 is a flow diagram showing the production of technical grade lithium carbonate according to the present invention.

The lithium carbonate processes are described in more detail with respect to FIGS. 2 and 3.

Lithium Carbonate Process Flow Diagram A

FIG. 2 shows that (1) solid soda ash is mixed with wash water filtrate (17) to make soda ash solution, SAS (2). In the first stage reactor (6) raffinate (3) containing 6% lithium following extraction of boron is mixed with SAS (2), mud from the direct chloride process (4), and mother liquor (5). This recovers the lithium entrained in the direct chloride muds and mother liquor, removes most of the magnesium, and dilutes the lithium concentration to around 1%.

At filter (7) the $MgCO_3$ mud (8) is separated from the brine and washed with mother liquor (5). The wash filtrate and the filtered brine are combined (10) and sent to the second stage reactor (12).

(12) In the second stage reactor, reagent (11) which is a combination of lime (9) and SAS (2) is added to precipitate $Mg(OH)_2$ and $CaCO_3$ which are removed as mud (14) by filtration (13).

(15) In the lithium carbonate reactor SAS (2) is added to precipitate lithium carbonate. The solid is separated from the resulting mother liquor by filtration (18). The mother liquor (5) is recycled and excess is removed through a bleed (19). The lithium carbonate is washed with hot, purified water (16) which is recycled through (17) and used in the production of SAS (2).

(20) Some of the wet lithium carbonate from the filter is sent to (B1) to be used in the production of low sodium lithium carbonate and the rest is sent to the dryer (21) and packaged as technical grade lithium carbonate (22).

FIG. 3

Low Sodium Lithium Carbonate Process Flow Diagram B (1) Wet lithium carbonate from (A20) is used as feed material.

(2) Lithium carbonate is mixed with the bicarbonate/carbonate mother liquor recycle (9) and fed into the lithium bicarbonate sparger reactor (3).

(3) Carbon dioxide gas is bubbled into the reactor where it reacts with the lithium carbonate forming lithium bicarbonate.

$$H_2O + CO_2 + Li_2CO_3 \rightarrow 2LiHCO_3 \quad \text{Reaction \#1:}$$

(4) Lithium bicarbonate solution is filtered to remove insoluble and unreacted small particles that are not removed by the settler.

(5) Lithium bicarbonate solution is heated to 60 to 100° C. to reverse Reaction #1 and precipitate purified lithium carbonate.

$$2LiHCO_3 \rightarrow Li_2CO_3 + CO_2 + H_2O \quad \text{Reaction \#2:}$$

(6) Lithium carbonate is separated from mother liquor and washed with 95° C. deionized water (7) on filter (6).

(8) Lithium carbonate is packaged in maxi sacks and stored until processing in the direct lithium chloride process at (C18) or dried to provide low sodium lithium carbonate.

(9) Mother liquor from the bicarbonate/carbonate crystallizer and wash water are recycled and a bleed (10) equal to the input wash is removed.

(11) Carbon dioxide gas used in the generation of lithium bicarbonate solution is recycled from the bicarbonate/carbonate crystallizer and a make-up source (12) is used to compensate for system leaks (14) and to keep a constant pressure on the lithium bicarbonate sparger reactor (3).

(13) A heat exchanger is used to preheat the bicarbonate solution prior to the precipitation tank and conserve system heat.

To increase the rate of conversion of lithium carbonate to lithium bicarbonate, it is preferred to employ baffles and dual pusher propellers to maximize the time that a bubble of carbon dioxide remains in solution. Increasing the height of the vessel also increases the residence time of the carbon dioxide. Using lithium carbonate with an average particle size of from about 75 to about 425 microns, preferably less than 250 microns, and more preferably less than 100 microns also increases conversion rates of lithium carbonate to lithium bicarbonate.

Technical grade lithium chloride can be directly precipitated from the same starting brine (about 6 wt % Li) used to prepare the low sodium lithium carbonate as described above. Thus, the process of the present invention produces a technical grade of lithium chloride product that is made directly from concentrated natural brine containing essentially 6 wt % lithium from which boron has been removed by the described extraction process of Brown and Boryta (U.S. Pat. No. 5,219, 550). The lithium chloride produced by this process is essentially higher in purity with respect to sodium and calcium content. Using quick lime (CaO) instead of slaked lime (Ca(OH)$_2$) to precipitate magnesium as a double salt gives better filtration properties and improved lithium yield as concentrated brine than what can be achieved using the process of Chilean Patent application 550-95. Brine concentrated to lithium concentrations less than 6% may also be treated by this method. However, the magnesium to lithium ratio is minimized when the concentration of lithium can be increased to approach the endpoint concentration of the system, i.e., 6.9 wt % Li, about 1 wt % Mg, thereby minimizing the amount of magnesium that remains to be removed.

The process involves removing the magnesium from the brine as a double salt using excess quick lime (CaO), separating the magnesium and calcium muds by filtration, cooling the filtered brine to decrease the sodium by precipitating sodium chloride, separating the sodium chloride solids by filtration, diluting the filtered brine slightly (to 29% LiCl) and treating the filtered brine with oxalate (oxalic acid) and barium (barium chloride) to remove precipitated calcium oxalate and barium sulfate, and subsequently crystallizing lithium chloride directly from the purified brine, e.g. in a vacuum crystallizer. The process may utilize the mother liquor produced in the process for preparing lithium carbonate as shown in FIG. 2 to recover the lithium lost to the magnesium removal step as described above. The use of lithium carbonate mother liquor improves the overall recovery of lithium as commercial products.

The process eliminates the need for using hydrochloric acid to produce lithium chloride from lithium carbonate and/or the LiOH.H$_2$O as in the processes of the prior art. The resultant chemical grade lithium chloride process of the invention has essentially 6 major steps described as follows:

1) Preparing a low-boron aqueous solution from natural brine and concentrating to a lithium content of about 6 wt %;

2) Extracting boron;

3) Removing magnesium and calcium by precipitation and filtration.

4) Cooling the brine and filtering to reduce the sodium content;

5) Adding oxalate and barium to remove calcium and sulfate by precipitation and filtration; and 6) Direct crystallization and isolation of lithium chloride.

The 6 wt % lithium brine is prepared as described above, e.g. by solar evaporation. The purification of the boron-free concentrated brine containing essentially 6 wt % lithium is described in more detail as follows.

Magnesium is removed from the brine by adding enough quick lime to form magnesium and calcium insoluble double salts. The use of quick lime instead of slaked lime improves the filterability of the magnesium/calcium containing muds and improves the overall brine yield containing lithium according to the following reaction which occurs in lithium concentrated brine at Ca(OH)$_2$/Mg mole ratio from 2-3:

$$18Ca(OH)_{2\,solid} + 10MgCl_{2\,solid} + 0.5H_2O_{liquid} \rightarrow Mg_{10}(OH)_{18}Cl_2.0.5H_2O_{solid} + 18CaClOH_{solid}$$

The filtration properties and lithium yield as brine improve substantially using quick lime (CaO) compared to slaked lime (Ca(OH)$_2$). In order to maintain the calcium insoluble, the Ca to Mg mole ratio for quick lime addition is preferably between 3 and 4 and the reaction is set forth below:

$$18CaO_{solid} + 10MgCl_{2\,solution} + 18.5H_2O_{liquid} \rightarrow 18CaClOH_{solid} + Mg_{10}(OH)_{18}Cl_2.0.5H_2O_{solid}$$

Regardless of whether quick lime or slaked lime is used, the process is typically conducted at temperatures ranging from about 25° C. to about 120° C. If filtration becomes a production rate controlling variable, then the temperature may be increased to precipitate both magnesium and calcium.

The final pH of the brine after completion of the reaction generally ranges from about 9.5 to about 12.0 measured after 1:10 dilution with water.

Excess slaked lime or additional reaction time may be used as a process control.

In a preferred embodiment, lithium lost to the lithium chloride magnesium purification solids may be recovered by re-slurrying these muds in the reactor for precipitating magnesium carbonate in the lithium carbonate process.

Compared to the magnesium removal steps described above for preparation of lithium carbonate (FIG. 2 (6)), an overall increase in lithium yield may be obtained for this purification step by adding magnesium and calcium double salt purification muds (FIG. 2 (4)) from the direct lithium chloride process.

Sodium may be removed to acceptable levels by either cooling before or after magnesium removal. However, cooling before magnesium removal also salts out $LiCl.H_2O$ because the brine is saturated with respect to lithium chloride and magnesium chloride. To overcome the loss of lithium, an extra filtration step may be used to recover the lithium precipitated followed by recycling the $LiCl.H_2O$ salt.

In a preferred embodiment, magnesium is removed first by addition of lime followed by cooling the brine containing 6% Li to from −30 to +10° C., preferably below 0° C., and more preferably −15° C. to −20° C., most preferably from −30 to below −20° C., also preferably from +10 to above −20° C., to reduce the sodium concentration to less than 0.05 wt % sodium in the brine. This level of sodium is low enough for producing a chemical grade of lithium chloride crystal that can be used as feed salt to produce lithium metal containing less than 1% Na. Removal of magnesium prior to cooling in essence produces a dilute brine with respect to lithium chloride, thereby substantially eliminating a lithium loss at this point in the process. A substantial portion of the calcium concentration in the brine when magnesium is removed is initially controlled by the quick lime addition in excess of a Ca/Mg mole ratio of 3, or by adjusting the pH above 11 by adding quick lime.

Removing the remaining sulfate as barium sulfate and calcium as insoluble calcium oxalate by the addition of barium chloride and oxalic acid, respectively, may be done in the same reactor with a single filtration step. Barium chloride and oxalic acid are preferred reagents for the precipitation step, although others may be used. Removal of sulfate and calcium may be done either before or after the sodium removal step. The brine is preferably diluted to about 42 wt % lithium chloride for this step. Therefore, it is preferred to conduct this purification step after the sodium removal.

In a preferred embodiment, the sulfate/calcium removal is conducted by first adding 20% barium chloride solution at a 1.2 barium to 1 sulfate molar ratio, mixing for about 12 hours, adding 20% oxalic acid to exceed the oxalic acid:calcium ratio to target 500 ppm residual oxalate, mixing for about 1.5 hours, filtering to remove barium sulfate and calcium oxalate, and lowering the pH of the purified brine to about 7.0 with concentrated HCl. The filtered lithium chloride brine is then ready for evaporation to produce lithium chloride.

To produce anhydrous lithium chloride from solution, it is preferred to conduct the crystallization in an evaporation crystallizer operating at a temperature above 110° C. If impurities reach unacceptable concentrations, the crystallizer solution may be returned to the purification steps for adjustment.

An example of the lithium chloride purity produced by the above process is as follows:

LiCl 99.0 wt %
Na 0.09-0.11 wt %
Ca 0.0015-0.003 wt %
Mg <0.0003 wt %
Ba 0.007 wt %
$SO_4$ 0.007 wt %
Si 0.004 wt %

The direct lithium chloride process is now described in more detail below with respect to FIG. 4. (1) CaO and low boron raffinate feed containing 6% lithium (2) are fed into the liming tank (3), where they are mixed at a weight ratio of about 15% lime to brine until the pH exceeds 11.0 as measured on a filtered sample diluted 1:10 with water. (4) The slurry produced in the liming tank is filtered to separate the magnesium-free brine from the Ca/Mg mud. The brine is sent to the filtrate tank (6) and the mud is sent to the muds tank (5) where it can be slurried and pumped to the lithium carbonate plant (A4 in FIG. 2) for recovering the entrained lithium in the first stage of the lithium carbonate plant (shown in FIG. 2 as (6)). (7) The magnesium-free brine is fed into the cooling reactor to precipitate sodium chloride to acceptable levels and is filtered at temperature in (8). The solids (9) are sent to waste or for lithium recovery in the carbonate plant. The low sodium brine is sent to the purification tank (10). (10) In the purification tank water is added to dilute the magnesium-free, low sodium brine to about 42% lithium chloride, barium chloride is added to precipitate barium sulfate, and lithium oxalate or oxalic acid is added to precipitate calcium oxalate from the brine. (12) The solution is filtered to remove the barium sulfate and calcium oxalate solids and is sent to the adjustment tank (13) for a final pH adjustment with concentrated HCl (19) to about pH 7.0 for feed to the crystallizer (14) and dryer (15) to produce anhydrous technical lithium chloride (17). (16) An optional pure lithium chloride wash solution can be employed to reduce levels of impurities such as potassium for technical grade lithium chloride. (18) Low sodium lithium carbonate (from FIG. 3 (B8)) is reacted with hydrochloric acid solution to produce a high purity lithium chloride solution, which is fed into the purification tank (10) and treated for sulfate and calcium and then isolated and dried as above to produce battery grade anhydrous lithium chloride.

Example 1

Decreased Mg to Li Ratio in Brine by KCl Addition

A solution of 0.63 g KCl in 2.01 g deionized water was added to 10.00 g brine 1 having the analysis shown in Table 5 at 20° C. Upon swirling the brine a fine, white precipitate of carnallite formed and was allowed to settle. The supernatant liquid was decanted as brine 2. The Mg/Li weight ratio in the brine had decreased from 0.73 to 0.41.

Example 2

A solution of 15.18 g KCl in 28.32 g deionized water at 95° C. was added by pipet to 150.1 g brine 1 with mixing. A fine, white precipitate of carnallite formed and was removed by vacuum filtration from product brine 3. The Mg/Li weight ratio in the brine had decreased from 0.73 to 0.37.

Example 3

A solution of 15.18 g KCl in 29.5 g deionized water at 108° C. was added to 150.1 g brine 1 with mixing. A fine, white precipitate of carnallite formed and was removed by vacuum filtration from intermediate brine 4. The Mg/Li weight ratio in the brine had decreased from 0.73 to 0.31. After removing a small sample of 4, the remainder of 4 was concentrated at a range of 20-60° C. and at a pressure of ~500 μm Hg with a high vacuum pump. Additional carnallite precipitated and was separated from final brine 5 by vacuum filtration at 20° C. The Mg/Li weight ratio in the final brine was 0.22.

Results for examples 1, 2 and 3 are shown in Table 5 below:

TABLE 5

| Brine | ID Number | % Li | % Mg | % Mg/% Li | ppm K | ppm Na | Ppm Ca |
|---|---|---|---|---|---|---|---|
| Feed | 1 | 4.62 | 3.36 | 0.73 | 670 | 630 | 970 |
| Example 1 Product | 2 | 4.15 | 1.72 | 0.41 | 6300 | 570 | 890 |
| Example 2 Product | 3 | 4.66 | 1.74 | 0.37 | 11800 | 590 | 1000 |
| Example 3 Intermediate | 4 | 4.72 | 1.44 | 0.31 | 10400 | 580 | 1000 |
| Example 3 Product after Concentration | 5 | 5.70 | 1.26 | 0.22 | 4100 | 690 | 1200 |

Example 4

Preparing Low Sodium Lithium Carbonate

To a concentrated brine containing 6.19% Li, 1.51% Mg, 0.179% Na, 0.026% K, 0.056% Ca, 0.002% $SO_4$, 0.0003% B, and 36% Cl which will be preferably prepared by removing magnesium as carnallite salt by adding a KCl solution to a natural or feed brine as set forth in the present invention, recycled mother liquor containing 0.14% Li, 8.26% Na, 0.18% $SO_4$, 12.37% Cl, and 0.58% $CO_2$ was added at a temperature of 70° C. Enough mother liquor was added to form a brine containing 1% Li and to precipitate most of the magnesium as magnesium carbonate and basic magnesium carbonate. The brine was filtered to remove the precipitated magnesium salts. The magnesium remaining in solution was removed by adding a limed soda ash reagent, which also removed calcium as an insoluble calcium carbonate solid. The resultant purified brine was filtered and contained 1% Li, 0.0002% Mg, 0.0024% Ca, 6.9% Na, and 15.5% Cl. A soda ash solution was prepared using lithium carbonate wash water filtrate and added to the purified brine. The lithium carbonate crystals were filtered and subsequently washed with hot deionized or distilled water and subsequently used as the feed to the bicarbonate reactor. The lithium carbonate filtrate was recycled to the process, and the wash filtrate was recycled to prepare the soda ash solution. A portion of the mother liquor was discharged from the process to remove the excess water and sodium chloride that had accumulated in the aqueous phase.

The filtered lithium carbonate crystals, a cooled mixture of recycled low sodium lithium carbonate mother liquor filtrate and wash water filtrate, and carbon dioxide gas from the low sodium lithium carbonate crystallizer were fed continuously to form a slurry in a baffled bicarbonate reactor. The carbon dioxide gas was dispersed using a high-speed mixer. The carbon dioxide gas and the mother liquor/wash filtrate solution were fed to the bottom of the reactor. This formed a bicarbonate solution that was filtered and sent to the lithium carbonate crystallizer. In this example the reactor temperature for forming the bicarbonate solution was controlled between 0 and 35° C. The lithium carbonate feed rate was controlled to maintain as much suspended solids as possible. The liquid volume of the entire system was maintained constant and the excess liquid volume generated by the addition of the wash filtrate was used to determine the process bleed.

Prior to feeding the cool bicarbonate solution to the crystallizer, the solution was filtered to remove insoluble impurities and heated in a heat exchanger to recover some of the heat contained in the recycled mother liquor and wash filtrate. The preheated bicarbonate solution was then continuously added to the heated bicarbonate decomposer/lithium carbonate crystallizer maintained at 70° C. to 90° C. The lithium carbonate solids and the liquid were continuously removed and filtered hot. The filtered low sodium lithium carbonate crystals were continuously washed with hot distilled water and then dried. The mother liquor and the wash filtrate were recycled to the bicarbonate reactor via a heat exchanger.

Table 6 gives an example of the production rate for the continuous purification apparatus described. Table 7 gives the analysis of products that were generated.

TABLE 6

Relation of Production Rate and Temperature in an Apparatus for Continuously Producing Low Sodium Lithium Carbonate

| REACTOR TEMPERATURE, ° C. | | $Li_2CO_3$ CRYSTALLIZATION RATE, |
|---|---|---|
| $LiHCO_3$ | $Li_2CO_3$ | grams/hour* |
| 35 | 70 | 45.4 |
| 35 | 90 | 89.2 |
| 10 | 70 | 108.9 |
| 0 | 70 | 113.4 |
| 10 | 90 | 133.5 |
| 0 | 90 | 195.2 |

TABLE 7

Chemical Analysis (dry basis)

| | $Li_2CO_3$ Feed, ppm | Low Sodium $Li_2CO_3$, ppm (average from Example 4) |
|---|---|---|
| Na | 800 | 4.0 ± 0.7 |
| Mg | 28 | 6.3 ± 1 |
| Ca | 81 | 34 ± 14 |
| S | 120 | 16 ± 16 |
| B | 1.2 | 0.5 ± 0.04 |
| Si | 82 | 4.5 ± 1.5 |
| Fe | 3.3 | 1.2 ± 0.3 |

Example 5

Preparing Ultra High Purity Lithium Carbonate

Ultra high purity lithium carbonate was prepared as described above in the same equipment to which was added an ion exchanger between the filter and the heat exchanger. The ion exchange column contained Amberlite IRC-718 resin formerly commercially available from Rohm & Haas. The purity of this product is listed in Table 8.

TABLE 8

Ultra High Purity Lithium Carbonate (EXAMPLE 5)

Wt %

| $Li_2CO_3$ | >99.995 |
|---|---|
| Mg | <0.00001 |
| Na | <0.0002 |

TABLE 8-continued

Ultra High Purity Lithium Carbonate (EXAMPLE 5)

Wt %

| | |
|---|---|
| K | <0.00015 |
| Ca | <0.00007 |
| $SO_4$ | <0.003 |
| B | <0.0001 |
| Cl | <0.005 |
| Si | <0.0001 |
| Zn | <0.00001 |
| Cr | <0.00001 |
| Cu | <0.0001 |
| Fe | <0.0001 |
| Ni | <0.0001 |
| P | <0.006 |

Example 6

Preparing Low Sodium Lithium Chloride

Hydrochloric acid (35% conc.) containing less than 0.00015% sodium was reacted with lithium carbonate prepared in Example 4. The resulting solution was evaporated to crystallize lithium chloride. The lithium chloride was filtered from the evaporated solution and dried.

Example 7

Preparing Ultra High Purity Lithium Chloride

Figure 4:
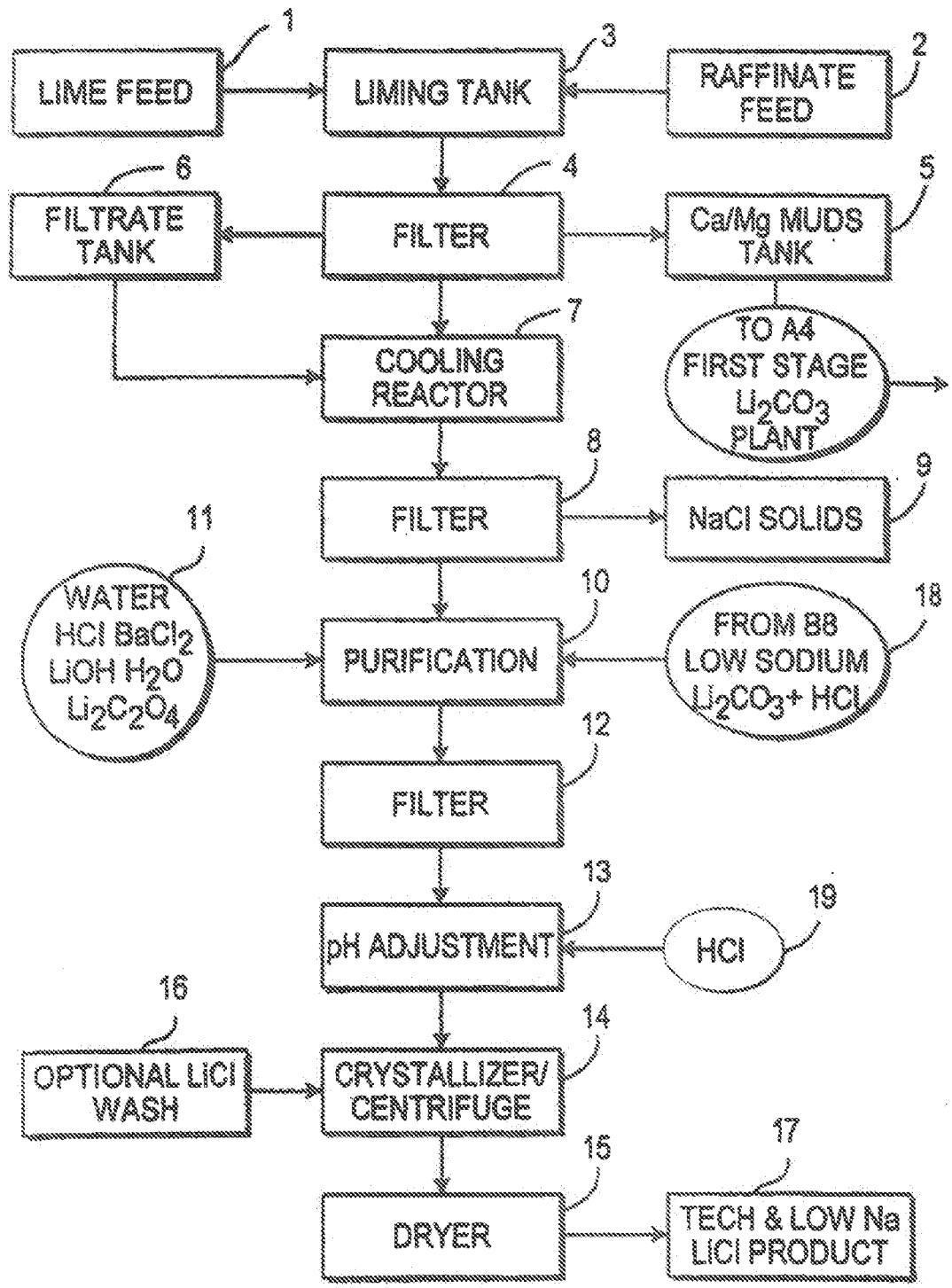
FIG. 4 is a flow diagram of the process of direct lithium chloride recovery from brine according to a preferred embodiment of the present invention.

As in Example 5, ultra-high purity lithium chloride was prepared by passing the lithium chloride brine described in FIG. 4 through an ion exchange column after step (12) to further reduce divalent and trivalent impurities. The brine was further processed to make ultra-high purity lithium carbonate or crystallized to make ultra-high purity lithium chloride.

Example 8

Low Sodium Lithium Carbonate Using an Absorption Column

The diagram in FIG. 6 was the laboratory set-up and the basis on which the larger scale tests were done using a sieve tray column (FIG. 7) and Scheibel column (FIG. 8).

The method followed that already described in Example 4. The purified product had the same composition as in Example 4. This demonstrated that absorption of carbon dioxide can be accomplished in a typical reactor with a bubbler or an absorption column.

Other facets of the invention will be clear to the skilled artisan, and need not be set out here. The terms and expressions which have been employed are used as terms of description and not of limitation, and there is no intention in the use of such terms and expression of excluding any equivalents of the features shown and described or portions thereof, it being recognized that various modifications are possible within the scope of the invention.

What is claimed is:

1. A process for reducing an amount of magnesium in a lithium-containing brine comprising
adjusting the brine to a lithium content of from 4.5 to 6.9 wt % to precipitate a first amount of magnesium as bischofite;
concentrating the brine by adding a sufficient amount of a solution of KCl to the adjusted brine to precipitate an additional amount of magnesium as carnallite, and
concentrating the brine further to precipitate another additional amount of magnesium as additional carnallite;
wherein the lithium-containing brine does not contain KCl as carnallite.

2. The method of claim 1, whereby the brine has an Mg/Li weight ratio, and the Mg/Li weight ratio of the brine is adjusted to a range of from 0.1 to 0.22 at a concentration of at least 5.7 wt % Li to 6.9 wt % Li.

3. The method of claim 2, wherein the Mg/Li weight ratio is decreased in at least one evaporation pond.

4. The method of claim 2, wherein the Mg/Li weight ratio is decreased in a container or pipe.

5. The method of claim 2, wherein some lithium may be precipitated as lithium carnallite.

6. The method of claim 2, further comprising the step of removing magnesium as carbonate or hydroxide salt.

7. The method of claim 6, wherein some lithium may be lost due to entrainment within muds that result from precipitated magnesium salts as the carbonate or hydroxide salts.

* * * * *